(12) United States Patent
Hanig

(10) Patent No.: US 8,291,664 B2
(45) Date of Patent: Oct. 23, 2012

(54) LAMINATED SPLICE PLATE FOR A GRAIN BIN

(75) Inventor: John A. Hanig, Sheffield, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 178 days.

(21) Appl. No.: 12/827,884

(22) Filed: Jun. 30, 2010

(65) Prior Publication Data

US 2012/0000157 A1   Jan. 5, 2012

(51) Int. Cl.
*F04B 2/00* (2006.01)
*B65D 6/00* (2006.01)

(52) U.S. Cl. .............. 52/464; 52/245; 52/584.1; 52/462; 220/4.33

(58) Field of Classification Search ........ 52/192, 52/245, 578, 584.1, 459, 462, 463, 464, 519; 403/300, 331, 339, 340, 393; 220/4.28, 4.33
See application file for complete search history.

(56) References Cited

U.S. PATENT DOCUMENTS

| | | | | |
|---|---|---|---|---|
| 1,125,070 A * | 1/1915 | Daviee | ......................... | 52/591.1 |
| 1,370,288 A * | 3/1921 | Cole | ......................... | 52/459 |
| 2,235,937 A * | 3/1941 | Linberg | ......................... | 264/36.15 |
| 2,293,569 A * | 8/1942 | Sonion | ......................... | 52/71 |
| 2,345,694 A * | 4/1944 | Wilson | ......................... | 52/463 |
| 2,729,313 A * | 1/1956 | Ernestus | ......................... | 52/246 |
| 2,953,276 A * | 9/1960 | Dunn | ......................... | 220/4.17 |
| 3,340,658 A * | 9/1967 | Dueringer | ......................... | 52/246 |
| 4,112,644 A * | 9/1978 | Allen | ......................... | 52/245 |
| 4,188,759 A * | 2/1980 | Liet et al. | ......................... | 52/245 |
| 4,395,857 A * | 8/1983 | Sheets et al. | ......................... | 52/245 |
| 4,616,465 A * | 10/1986 | Byers et al. | ......................... | 52/745.01 |
| 5,595,037 A * | 1/1997 | Paques | ......................... | 52/578 |
| 5,829,209 A * | 11/1998 | Keyl | ......................... | 52/192 |
| 6,957,518 B1 * | 10/2005 | Koch, Jr. | ......................... | 52/849 |
| 2006/0236648 A1 * | 10/2006 | Grundman et al. | ......................... | 52/726.4 |
| 2008/0041009 A1 * | 2/2008 | Cairo et al. | ......................... | 52/651.07 |
| 2009/0016897 A1 * | 1/2009 | Olgaard | ......................... | 416/244 R |
| 2010/0071275 A1 * | 3/2010 | Mathai et al. | ......................... | 52/40 |

OTHER PUBLICATIONS

Brock Introduces M Series™ Line of Million-Bushel Capacity Grain Bins with Free-Span Roof Structure and SMOOTHCORR™ Sidewall System, Brock Grain Systems News, http://www.brockgrain.com/news.php?news_id-144, Brock Grain Systems—A Division of CTB, Inc., Milford, Indiana 46542 U.S.A.

* cited by examiner

*Primary Examiner* — Robert Canfield
*Assistant Examiner* — Brent W Herring
(74) *Attorney, Agent, or Firm* — Zarley Law Firm, P.L.C.

(57) ABSTRACT

A device for connecting sheets of a grain bin together having an inner plate that fits over a vertical seam formed at the ends of two abutting sheets. The inner plate has a plurality of holes that generally align with holes in the ends of the sheets. An outer plate is positioned to cover the vertical seam and has a plurality of holes that generally align with the holes on the ends of the sheets. Bolts extend through the holes to secure the inner plate, sheets, and outer plate together.

12 Claims, 4 Drawing Sheets

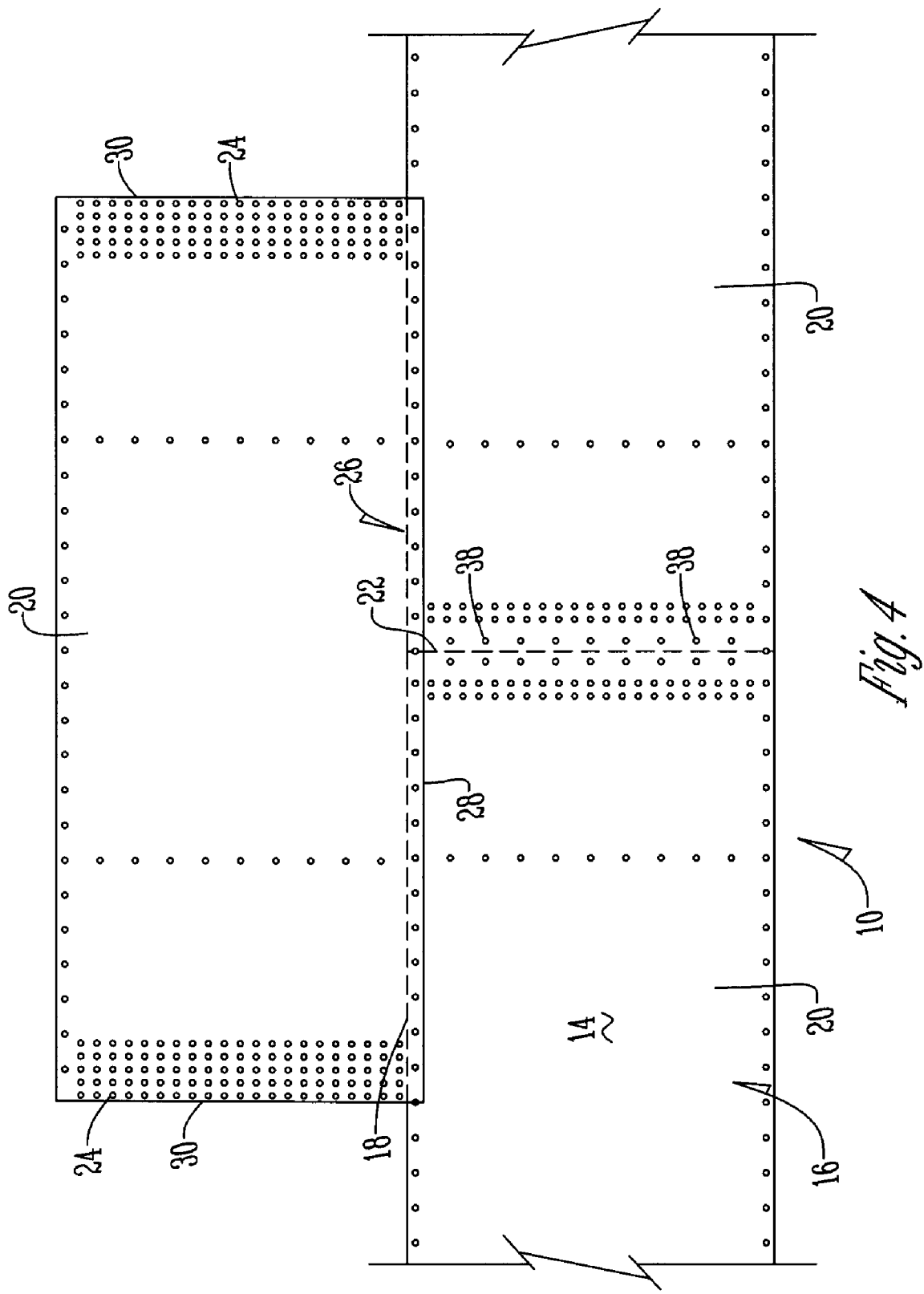

LAMINATED SPLICE PLATE FOR A GRAIN BIN

BACKGROUND OF THE INVENTION

This invention is directed to a device for connecting grain bin sheets and more particularly to the use of splice plates to connect grain bin sheets together.

Grain bins are well known in the art. The maximum thickness of steel that most bin roll-forming machinery can process is 8 ga., which is 0.16 inches thick. Very large commercial galvanized corrugated steel bins such as a 135 ft. diameter bin having an 88 ft. eave height (24 rings) often needs triple laminated sheets near the bottom of the sidewall to get the overall material thickness of 0.48 inches needed to achieve the structural strength required. In this bin size, typically the lower 9 rings would be triple laminated sheets of 8 or 9 gauge galvanized steel.

Generally, on smaller diameter bins, the sheets are connected by overlapping the ends of the sheets as shown in FIG. 1. For very large bins, due to the thickness and size of sheets required, the overlapping connection creates nearly a ½ inch gap at the bottom of an upper ring where the horizontal seam meets the vertical seam. The ½ inch gap not only needs to be filled to prevent grain leakage, which could weaken the structural integrity of the bin creating a possible failure, but the gap also causes the holes along the vertical seam to fall out of alignment due to thicker gauges of steel being bolted together.

During production, holes are punched at the same spacing. When the laminated sheets are connected due to thicker gauges of steel and a greater radius, the holes fall out of alignment. When erecting a grain bin, to aid in the speed of erection it is desired to have bolts that fit easily into the holes while at the same time having a tight clearance between the hole and bolt for greater structural integrity. More specifically, it is desired to eliminate the gaps between sheets so that bolts are drawn up tight. Accordingly, there exists a need in the art for a device that addresses these deficiencies.

An objective of the present invention is to provide a device that eliminates the gap created by overlapping the ends of corrugated steel sheets especially where the vertical and horizontal seams connect.

A further objective of the present invention is to provide a device that improves the speed of erecting a grain bin while maintaining structural integrity.

These and other objectives will be known to others based upon the following written description.

SUMMARY OF THE INVENTION

A device for connecting sheets of a grain bin together having an inner plate that fits over a vertical seam formed at the ends of two abutting sheets. The inner plate has a plurality of holes that generally align with holes in the ends of the sheets. An outer plate is positioned to also cover the vertical seam and has a plurality of holes that generally align with the holes on the ends of the sheets. Bolts extend through the holes to secure the inner plate, sheets, and outer plate together.

BRIEF DESCRIPTION OF THE DRAWINGS

FIG. 4 is a partial side view of a sidewall of a grain bin.

DETAILED DESCRIPTION OF THE PREFERRED EMBODIMENTS

Figure 1:
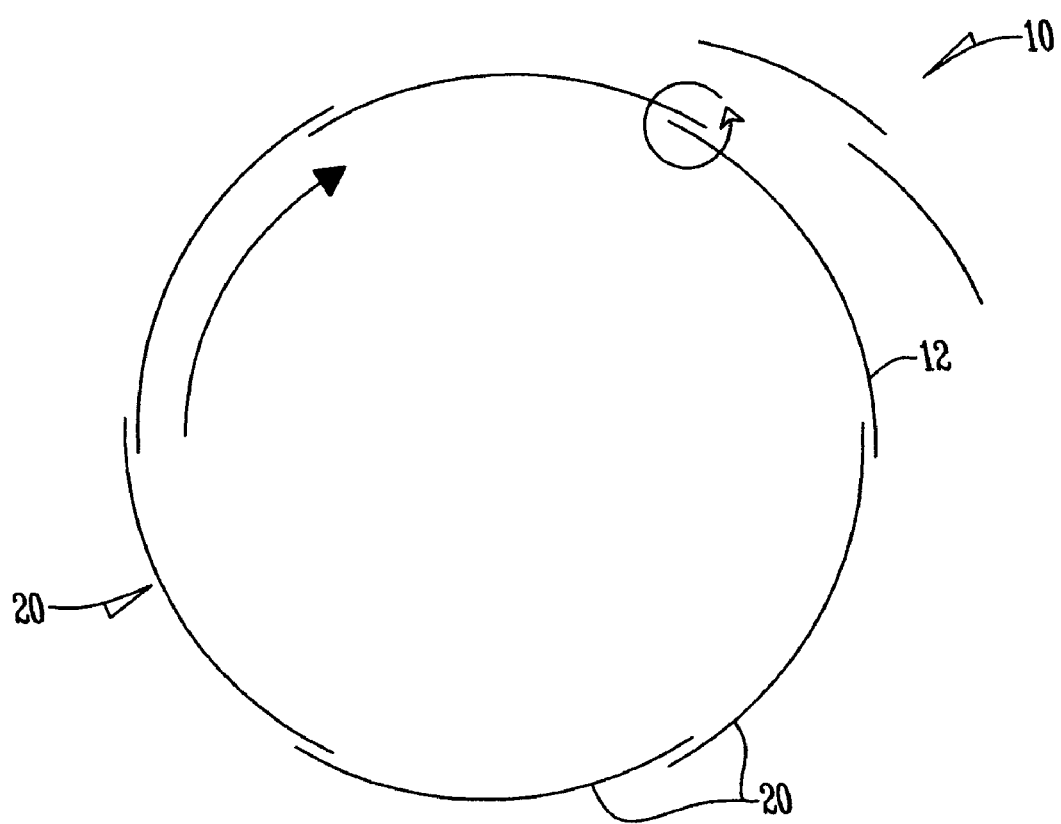
FIG. 1 is a top plan view of a ring of a grain bin.

Referring to the Figures, a grain bin 10 includes a sidewall 14 that is formed by a plurality of rings 16 with each ring 16 being attached to one another along a horizontal seam 18. Each ring 16 is comprised of a plurality of corrugated galvanized sheets 20 that are attached from end-to-end along a vertical seam 22. The sheets 20 have a plurality of holes 24 along the outer periphery of the top edge 26, bottom edge 28 and ends 30. Preferably, the sheets 20 are laminated or triple laminated.

The sheets 20 are connected together using a splice plate 32 that has an inner plate 34 and an outer plate 36. The inner plate 34 and outer plate 36 have a plurality of holes 38 that generally align with holes 24 along the ends 30 of sheets 20. The alignment of the two plates provides two shear points on the bolt (double shear) that places more uniform loading on the bolt to maintain the bolt in a perpendicular position in relation to the sheets. The hole spacing on the outer plate 36 is wider than the hole spacing on the inner plate 34 to compensate for the small differences in radius that occurs by laminating the sheets 20. The wider hole spacing allows bolts 40 to go through holes 24 and 38 with minimal interference increasing the strength of the connection.

Figure 2:
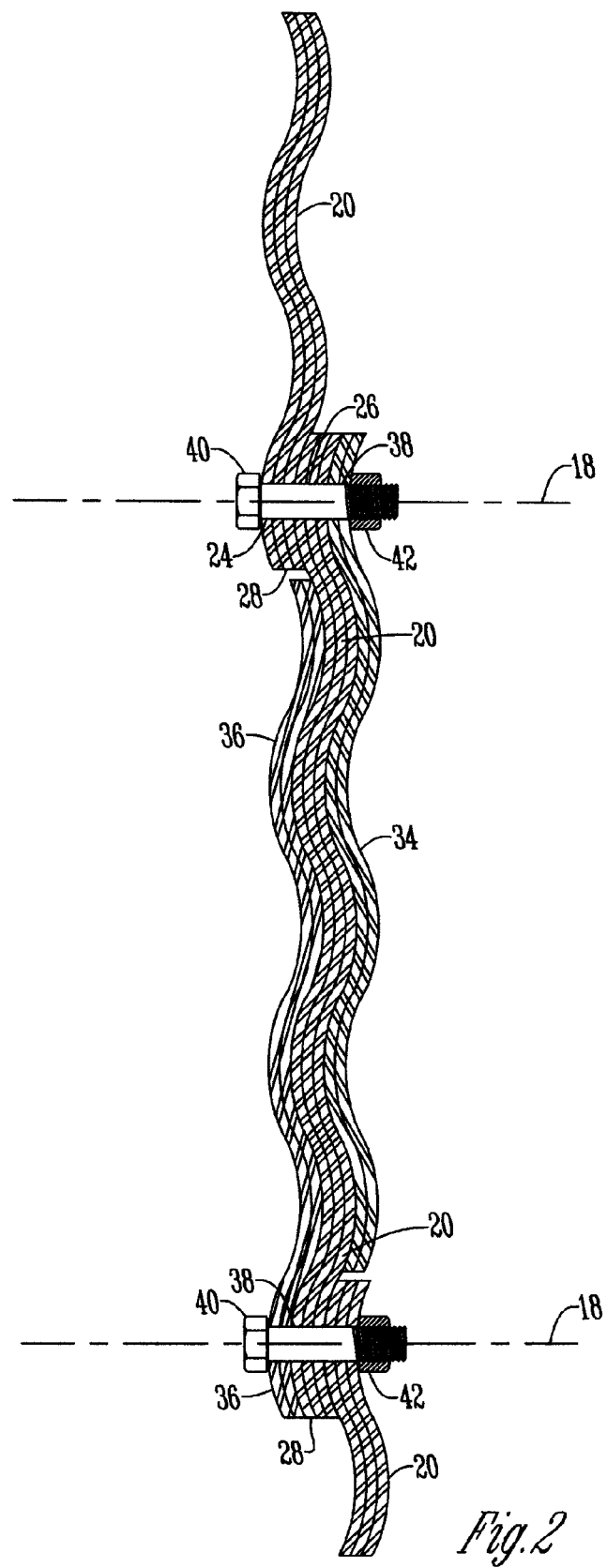
FIG. 2 is a sectional view of a splice plate along a horizontal seam.
Figure 3:
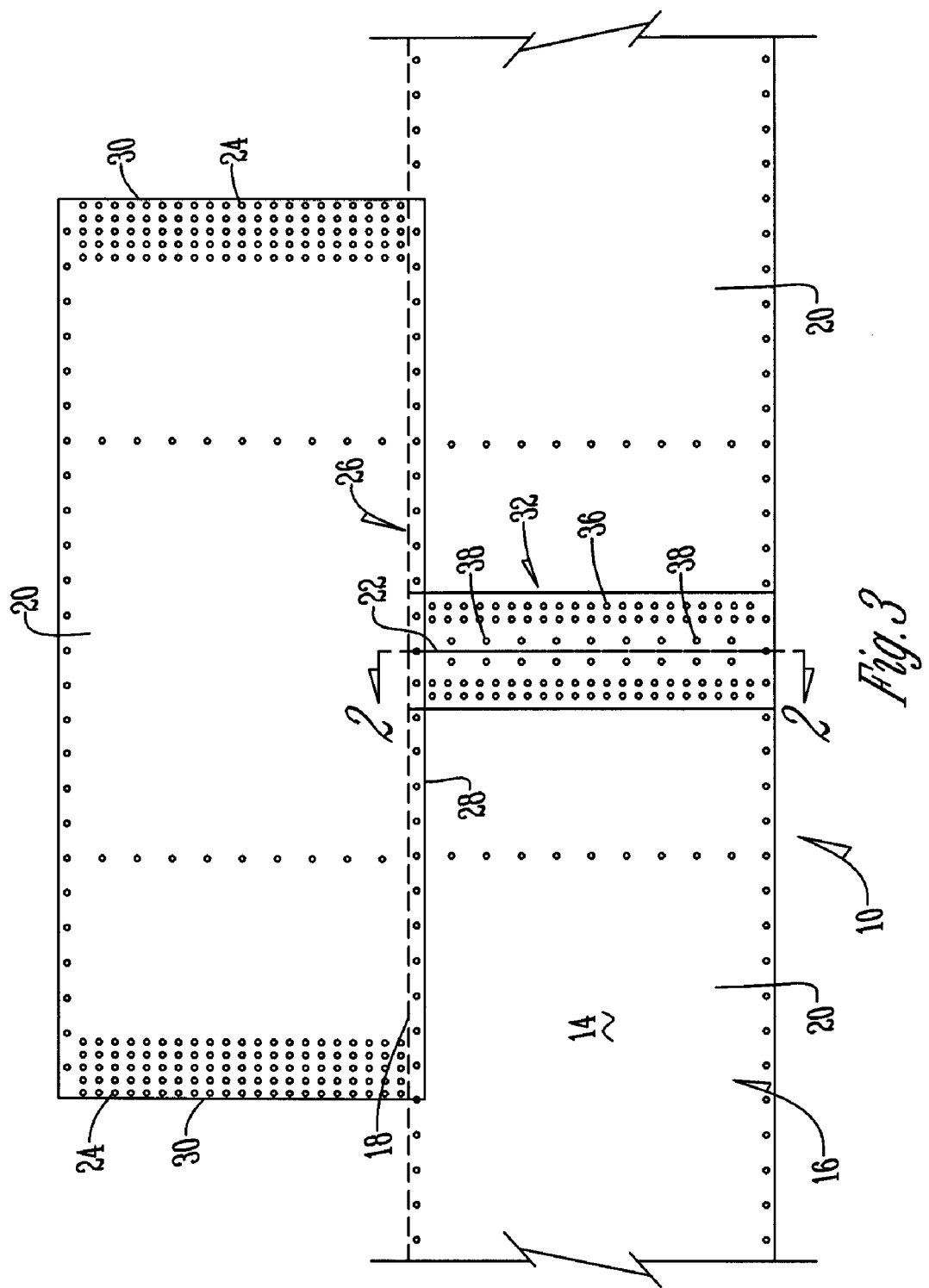
FIG. 3 is a partial side view of a sidewall of a grain bin.

To connect the sheets 20, the end 30 of a first sheet is abutted to the end 30 of an adjacent second sheet to form a vertical seam 22. Once abutted, the inner plate 34 and outer plate 36 are placed on the inner and outer surfaces of the sheets 20 to cover the vertical seam 22 and such that holes 38 of the plates generally align with holes 24 on the ends 30 of sheets 20. In a preferred embodiment, as shown in FIG. 2, the outer plate 36 extends below the horizontal seam 18 of the bottom edge 28 of sheets 20, while the inner plate 34 extends above the horizontal seam 18 and aligns with the top edge 26 of the sheets 20.

Once aligned, bolts 40 are inserted through holes 24 and 38 and the inner plate 34, sheet 20, and outer plate 36 are secured together along vertical seam 22 by a nut 42. Accordingly, a device has been shown that connects the sheets of a grain bin together that eliminates the gap formed at the corners of the vertical and horizontal seams. As such, a smoother seam connection is created with greater structural integrity that is easier and faster to install.

What is claimed is:
1. A device for connecting sheets of a grain bin, comprising:
a first sheet and a second sheet having a top edge, a bottom edge and ends that abut one another to form a vertical seam; wherein each end has a plurality of holes;
a third sheet having a top edge, a bottom edge and ends; wherein the bottom edge of the third sheet extends below the top edge of the first and second sheets to form a horizontal seam;
an inner plate positioned on an inner surface of the first and second sheets to cover the vertical seam; the inner plate having a plurality of holes that generally align with the holes on the first and second sheets;
an outer plate positioned on an outer surface of the sheets to cover the vertical seam; the outer plate having a plurality of holes that generally align with the holes on the first and second sheets;
a plurality of bolts that extend through the holes on the inner plate, the first and second sheets, and the outer plate; and wherein the abutment between the ends of the first and second sheets from a part of a ring of a grain bin sidewall; and wherein the inner plate aligns with the top edge of the first sheet and second sheet.

2. The device of claim 1 wherein the outer plate aligns with the bottom edge of the first sheet and second sheet.

3. The device of claim 1 wherein the alignment of the holes of the inner plate with the holes on the first and second sheets and the alignment of the holes of the outer plate with the holes on the first and second sheets provides two shear points on the plurality of bolts that extend through the holes on the inner plate, the first and second sheets, and the outer plate.

4. The device of claim 1 wherein the grain bin sidewall is formed by a plurality of rings wherein each ring is attached to one another along the horizontal seams.

5. The device of claim 1 wherein the first sheet and second sheet are corrugated galvanized sheets.

6. The device of claim 5 wherein the first sheet and second sheet are triple laminated.

7. The device of claim 1 wherein the inner plate and outer plate connect the first sheet to the second sheet along the vertical seam such that a gap formed at corners of the vertical and horizontal seam is eliminated.

8. The device of claim 1 wherein the hole spacing on the outer plate is wider than the hole spacing on the inner plate to compensate for differences in radius.

9. The device of claim 1 wherein a top edge of the outer plate terminates adjacent the bottom edge of the third sheet.

10. The device of claim 1 wherein a bottom edge of the inner plate terminates adjacent a top edge of a fourth sheet.

11. The device of claim 1 wherein the hole spacing on the outer plate is wider than the hole spacing on the inner plate to compensate for differences in radius.

12. A device for connecting sheets of a grain bin, comprising:
- a first sheet and a second sheet having a top edge, a bottom edge and ends that abut one another to form a vertical seam; wherein each end has a plurality of holes;
- a third sheet having a top edge, a bottom edge and ends; wherein the bottom edge of the third sheet extends below the top edge of the first and second sheets to form a horizontal seam; wherein the bottom edge has a plurality of holes;
- an inner plate positioned on an inner surface of the first and second sheets to cover the vertical seam; the inner plate having a plurality of holes that generally align with the holes on the first and second sheets;
- an outer plate positioned on an outer surface of the sheets to cover the vertical seam; the outer plate having a plurality of holes that generally align with the holes on the first and second sheets;
- a plurality of bolts that extend through the holes on the inner plate, the first and second sheets, and the outer plate; and
- wherein the abutment between the ends of the first and second sheets form a part of a ring of a grain bin sidewall; and
- wherein the inner plate aligns with the top edge of the first sheet and second sheet;
- wherein the outer plate aligns with the bottom edge of the first sheet and second sheet.

\* \* \* \* \*

UNITED STATES PATENT AND TRADEMARK OFFICE
CERTIFICATE OF CORRECTION

| | | |
|---|---|---|
| PATENT NO. | : 8,291,664 B2 | Page 1 of 1 |
| APPLICATION NO. | : 12/827884 | |
| DATED | : October 23, 2012 | |
| INVENTOR(S) | : John A. Hanig | |

It is certified that error appears in the above-identified patent and that said Letters Patent is hereby corrected as shown below:

Col. 3, line 2: delete "from" and insert --form--

Signed and Sealed this
Eleventh Day of December, 2012

David J. Kappos
*Director of the United States Patent and Trademark Office*